United States Patent [19]
Grohmann et al.

[11] 4,362,709
[45] Dec. 7, 1982

[54] PROCESS OF PREPARING SINTER MAGNESIA

[75] Inventors: Helmut Grohmann, Bruck an der Mur; Peter Stadler, St. Jakob bei Mixnitz, both of Austria

[73] Assignee: Veitscheer Magnesitwerke-Actien-Gesellschaft, Vienna, Austria

[21] Appl. No.: 318,970

[22] Filed: Nov. 2, 1981

[30] Foreign Application Priority Data

Nov. 7, 1980 [AT] Austria .................... 5492/80

[51] Int. Cl.³ .............................................. C01F 5/06
[52] U.S. Cl. ................................... 423/636; 423/158; 423/166; 423/240; 423/242
[58] Field of Search ............. 423/636, 240 R, 242 A, 423/158, 166

[56] References Cited

U.S. PATENT DOCUMENTS

| 3,060,000 | 10/1962 | Snyder et al. | 423/636 |
| 3,378,615 | 4/1968 | Zisner | 423/636 |
| 3,386,798 | 6/1968 | Bevans et al. | 423/242 A |
| 3,573,079 | 3/1971 | Shibasaki et al. | 423/636 |
| 3,980,753 | 9/1976 | Grill et al. | 423/163 |
| 4,100,254 | 7/1978 | Grohmann et al. | 423/163 |
| 4,108,959 | 8/1978 | Tatani et al. | 423/240 |
| 4,255,399 | 3/1981 | Grill et al. | 423/166 |
| 4,255,402 | 3/1981 | Lowell | 423/242 A |

FOREIGN PATENT DOCUMENTS

| 54-109072 | 8/1979 | Japan | 423/240 |
| 245036 | 6/1969 | U.S.S.R. | 423/240 R |

Primary Examiner—O. R. Vertiz
Assistant Examiner—Wayne A. Langel
Attorney, Agent, or Firm—Kurt Kelman

[57] ABSTRACT

In a process of preparing sinter magnesia from magnesium oxide in a sintering kiln evolving flue gases during sintering, the flue gases are washed before their removal from the kiln to the atmosphere with a portion of the magnesium chloride slurry formed during the preparation of the magnesium oxide and the magnesium chloride slurry used for washing the flue gases is recycled to the slurry wherefrom the magnesium sol for making the magnesium oxide is derived.

8 Claims, 1 Drawing Figure

U.S. Patent     Dec. 7, 1982     4,362,709
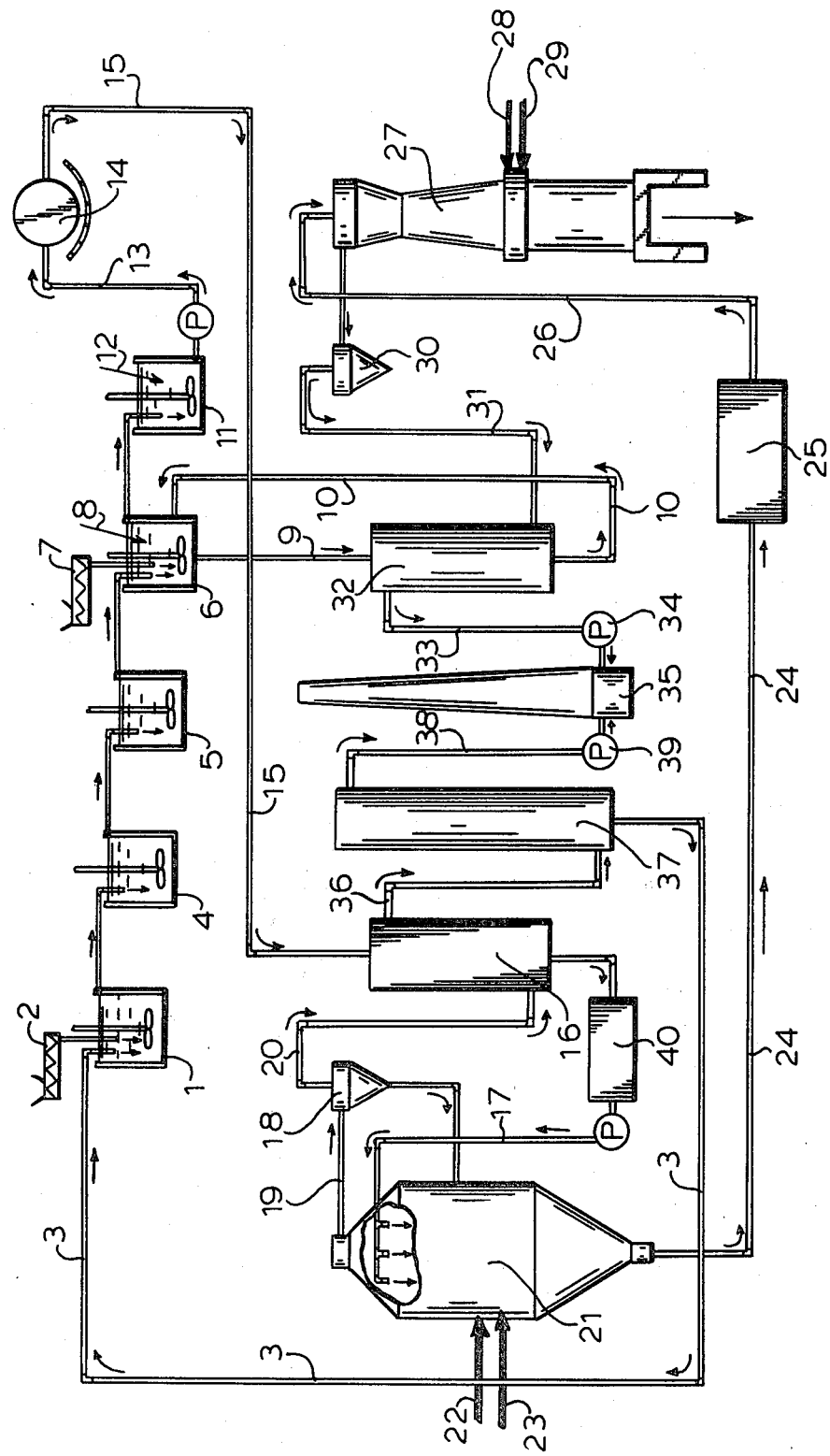

PROCESS OF PREPARING SINTER MAGNESIA

The present invention relates to a process of preparing sinter magnesia from magnesium oxide in a sintering kiln evolving flue gases during sintering.

Magnesium oxide for the preparation of sinter magnesia is prepared by the thermal decomposition of a magnesium chloride sol derived from a slurry of a magnesium-containing starting material dissolved in hydrochloric acid to form a magnesium chloride slurry and subsequent treatment of the slurry to precipitate and remove impurities therefrom, the subsequent treatment optionally including the step of adding sulfate ions to the slurry to precipitate and remove calcium impurities in the form of calcium sulfate.

If the magnesium oxide is as free of impurities as possible to obtain a pure end product, the sintering will produce flue gases containing polluting amounts of hydrochloric acid and sulfur dioxide, as well as possibly sulfur trioxide, if released into the atmosphere unchanged. A portion of the sulfur dioxide comes from the firing of the kiln during the sintering process while the remainder of the sulfur dioxide is generated by purification of the magnesium chloride slurry to obtain the sol which is thermally decomposed for the preparation of the magnesium oxide which then contains an undesired sulfur dioxide impurity.

It has been proposed to wash flue gases evolving during sintering of magnesite material, i.e. a material consisting essentially of natural magnesium carbonate, with water, such flue gases usually containing sulfur compounds in addition to magnesium oxide dust, the sulfur compounds coming partly from the firing of the sintering kiln and partly from binders used to bond the sintered particles together. In this washing process, the magnesium oxide dust is suspended in the washing water and reacts with the sulfur compounds in the fuel gases so that these compounds are removed therefrom. This washing process requires several stages to convert the sulfur compounds in the flue gases into a substance useful in the magnesite industry, i.e. magnesium sulfate, and thus to avoid turning the flue gas pollution problem into a storage problem for unwanted products.

If this known flue gas washing process were used for the effective scrubbing of flue gases evolved in the sintering of magnesium oxide, the scrubbing liquid would contain hydrochloric acid and sulfur compounds in such diluted form that their recycling would require an economically unacceptable energy input.

It is a primary object of this invention to improve a process of preparing sinter magnesia from magnesium oxide so that polluting components of the evolving flue gases are removed in a simple installation and with a favorable use of energy while providing useful recycling of the scrubbing liquid.

The above and other objects are obtained according to the invention in a process of the first-described type by washing the flue gases before removal thereof from the kiln to the atmosphere with a portion of the magnesium chloride slurry formed during the preparation of the magnesium oxide, and recycling the magnesium chloride used for washing the flue gases to the slurry wherefrom the magnesium sol is derived.

This scrubbing process is very advantageous and the flue gas components constituting pollutants are washed out of the flue gases in a very simple, one-stage procedure requiring no supply of water, additional treatment or intermediate storage, the scrubbing liquid being directly recycled to the chemical process for preparing the material to be sintered. In addition, the recycled slurry improves the stoichiometric conditions of the chemical reaction process involved in preparing the magnesium oxide and further saves energy in the treatment of the magnesium slurry and the thermal decomposition of the magnesium sol because of the heat contained in the recycled slurry by its contact with the hot flue gases.

The above and other objects, advantages and features of the present invention will become more apparent from the following detailed description of some now preferred embodiments thereof set forth in the Examples and of an installation useful for carrying out the process, as shown diagrammatically in the attached drawing.

The magnesium chloride slurry used for washing the flue gases is so strongly buffered by alkaline substances it contains, such as magnesium oxide and magnesium hydroxide, that its pH-value is hardly changed by the absorption of hydrochloric acid, sulfur dioxide and sulfur trioxide, and this makes it possible to remove hydrocloric acid and the sulfur oxides substantially in a single scrubbing step.

Water is evaporated from the magnesium chloride slurry when it contacts the hot flue gases and since this recycled slurry is used in the preparation of the magnesium chloride sol, the sol has a higher concentration and its thermal decomposition requires less energy for the preparation of the magnesium oxide. At the same time, the capacity of the installation for the thermal decomposition stage is increased.

Since it is desirable to convert the sulfur dioxide absorbed by the scrubbing liquid from the flue gases of the sintering kiln into sulfur trioxide used to generate sulfate ions in the magnesium chloride slurry for precipitating undesired calcium ions therefrom, it is preferred to use a magnesium chloride slurry containing $Fe(OH)_3$ for washing the flue gases. Usually the magnesium chloride slurry used in conventional processes of preparing magnesium oxide contains sufficient amounts of $Fe(OH)_3$ for this purpose but if this is not the case, a suitable amount of iron or a suitable iron compound is added to the starting material or to the slurry. We prefer to use a magnesium chloride slurry containing between 10 and 70 g/l of freshly precipitated $Fe(OH)_3$. Freshly precipitated $Fe(OH)_3$ is particularly useful in oxidizing sulfur dioxide to sulfur trioxide.

According to a preferred feature of this invention, air is blown into the magnesium chloride scrubbing slurry to provide the oxygen required for the oxidation. Alternatively, air may be introduced into the used slurry or into the slurry for preparing the magnesium chloride sol.

According to another preferred feature of the invention, the pH-valve of the magnesium chloride scrubbing slurry is adjusted by the addition of a substance decreasing the acidity of a value promoting the precipitation of the impurities but the slurry still contains impurities. This produces a particularly simple processing and very favorable timing of the recycling of the scrubbing liquid to the preparation stage of the magnesium chloride sol when the impurities are precipitated from the slurry in a container, the slurry used for washing the flue gases is taken from the container and is recycled thereto.

Furthermore, it is very useful for the precipitation of the usual impurities contained in the magnesium chloride slurry and for most efficient scrubbing of the flue gases if the pH-value of the magnesium chloride slurry for washing the flue gases is adjusted to 3.5 to 7.

If desired, dust may be removed from the flue gases before they are scrubbed. However, this may not be required because the scrubbing liquid removing hydrochloric acid and sulfur oxides also tends to remove dust from the flue gases. The washed-out dust then serves as precipitant for iron and similar impurities of the starting material so that additional precipitating agents may be saved.

As diagrammatically shown in the drawing, an installation for carrying out the flue gas scrubbing process of the invention comprises mixing vat 1 receiving hydrochloric acid through inlet conduit 3 and a comminuted magnesium-containing starting material, such as milled crude magnesite ore or serpentine ore, from metering device 2. The hydrochloric acid dissolves the starting material in three stages, the reaction being initiated in mixer 1, continued in mixer 4 and substantially completed in mixer 5. An agitator is mounted in the mixers to further the reaction. The magnesium chloride slurry produced in mixing vat 5 is introduced into mixing vat 6 and a precipitating agent is added thereto by metering device 7. This mixer is also equipped with an agitator and compressed air is introduced into the mixture of the slurry and precipitating agent through inlet conduit 8. The aerated mixture from mixing vat 6 is introduced into mixing vat 11 also equipped with an agitator and inlet conduit 12 for the introduction of compressed air to continue the precipitation reaction. The mixture in mixing vat 11 is pumped through conduit 13 to filter 14 where the impurities precipitated by the precipitating agent in mixers 6 and 11 are removed, and the resultant magnesium chloride sol is introduced through conduit 15 into heat exhanger 16 which is constituted as a gas scrubber. The concentrated magnesium chloride sol coming from the heat exchanger may be purified, if required, by addition of sulfate ions (for example in the form of magnesium sulfate) in container 40 to remove calcium ions from the sol, as has been disclosed, for example, in Austrian Pat. No. 347,403. If the sol contains no calcium ion impurities, undesired sulfate ions (coming, for example, from the flue gas scrubbing stage) may be removed in container 40 by the addition of calcium ions (for example in the form of calcium chloride).

The concentrated and purified magnesium chloride sol is conveyed from container 40 through conduit 17 to furnace 21 which is heated by burners 22 and 23. In this furnace, the sol is thermally decomposed and the resultant magnesium oxide is removed through the bottom of the furnace by conduit 24 which conveys the magnesium oxide to a treatment stage 25 where it is compacted. This compacted material, which may be suitably shaped, for example into briquettes, is conveyed through conduit 26 to sintering kiln 27 which is heated by burners 28 and 29.

In addition to the magnesium oxide, the thermal decomposition in furnace 21 produces water vapor and hydrochloric acid which are removed from the furnace through conduit 19, together with the combustion gases generated by burners 22 and 23. Solid components are removed from the flue gases of furnace 21 in cyclone 18 and the flue gases are directed through conduit 20 to heat exchanger 16 to provide part of its heat energy and to add any residual magnesium oxide dust contained therein to the magnesium chloride sol in the heat exchanger. The flue gases are then conveyed from heat exchanger 16 through conduit 36 to absorption column 37 wherein the hydrochloric acid is washed out of the flue gases to produce the hydrochloric acid supply delivered to mixing vat 1 by conduit 3. If desired, a collecting receptacle for the hydrochloric acid may be placed in conduit 3. The purified flue gases leave absorption column 37 through conduit 38 and are blown by fan 39 into chimney 35.

The illustrated installation shows a shaft furnace for sintering the magnesium ocide. However, it is also possible to use a rotary sintering kiln or any other suitable sintering device.

After the flue gases from sintering kiln 27 are freed of dust in cyclone 30, they are conveyed through conduit 31 to flue gas scrubber 32 whereinto conduit 9 introduces the magnesium chloride slurry from container 6 as scrubbing liquid. The spent slurry is recycled from scrubber 32 through conduit 10 to container 6. The flue gases washed in scrubber 32 are removed through conduit 33 and blown by fan 34 into chimney 35.

The following examples will further illustrate the practice of the present invention.

EXAMPLE 1

In the installation illustrated schematically in the drawing, crude magnesite containing 36% MgO and 4% FeO, by weight, was mixed with hydrochloric acid to produce the desired magnesium chloride slurry and sol. The following amounts refer to the reaction per operating hour in a continuous process. Comminuted magnesite was added to the magnesite chloride slurry in container 1 at a rate of 1349 kg/h and hydrochloric acid containing 18.6%, by weight, of HCl was added at a rate of 5377 kg/h. The resultant slurry was continuously conveyed from container 1 to containers 4 and 5 in which the reaction was continued. At the completion of the slurrying process, the slurry had a temperature of 85° C., and this slurry was conveyed at a rate of 6000 kg/h from container 5 to container 6. Caustically burnt magnesite was added to the slurry in container 6 as precipitating agent at a rate of 118 kg/h, the addition of the precipitating agent adjusting the pH-value of the slurry to 4. The slurry containing the precipitating agent had a content of 9 g/l of freshly precipitated Fe(OH)$_3$. At the same time, 11 m$^3$/h of slurry were removed from container 6 through conduit 9, were contacted with the flue gases from sintering kiln 27 in scrubber 32 and were then recycled through conduit 10 to container 6. The flue gases is an amount of 2219 Nm$^3$/h had a temperature of 200° C. in conduit 31 and were cooled to 65° C. in conduit 33 after scrubbing. The hot flue gases coming from the sintering kiln caused evaporation of 300 kg/h of water from the scrubbing slurry.

The sulfur dioxide content of the flue gases from sintering kiln 27 were reduced from 12 kg/h to 1 kg/h and the original content of 27 kg/h of hydrochloric acid was practically removed entirely. The scrubbed pollutants, i.e. 11 kg/h sulfur dioxide, which was converted by oxidation to 14 kg/h of sulfur trioxide, and 27 kg/h of hydrochloric acid were conveyed through conduit 10 to container 6 where this recycled slurry was re-used in the process. To oxidize the Fe(II)-ions, a total of 110 m$^3$/h of air was blown concurrently into precipitating containers 6 and 11 where the air was finely distributed by the agitators in the containers. The process produced 542 kg/h of sinter magnesia removed from kiln 27.

EXAMPLE 2

Serpentine, which is an ore consisting essentially of magnesium silicate hydrate, was used as the magnesium-containing starting material. As in Example 1, the following amounts refer to the reaction per operating hour in a continuous process carried out in the illustrated installation. However, since the calcium content of serpentine is very low, precipitating stage 40 was omitted.

Milled serpentine and hydrochloric acid having an HCl-content of 201 g/l were introduced in container 1 at respective rates of 1198 kg/h and 5596 kg/h. The serpentine raw material had the following composition, by weight:

| | |
|---|---|
| Ignition loss | 10.4% |
| $SiO_2$ | 38.8% |
| $Fe_2O_3$ | 7.8% |
| MgO | 41.5% |
| Other | 1.5% |

The serpentine ore was dissolved in a continuously proceeding reaction in containers 1, 4 and 5. The product of container 5 was introduced at a rate of 6394 kg/h in container 6 where the pH-value of the slurry was brought to about 4 by the addition of 102 kg/h of caustically burnt magnesite. The slurry was completely neutralized and Fe-, Mn-, Al- and Ni-ions were precipitated as hydroxides while air was blown into containers 6 and 11 which were constituted by vessels in which the reaction proceeded in cascade under agitation. Eleven cubic meter per hour of a slurry containing 29 g/l of freshly precipitated $Fe(OH)_3$ were removed from container 6 and introduced into flue gas scrubber 32 were the slurry was brought into intimate contact with the flue gases coming from sintering kiln 27. The liquid flowing out of the scrubber was continuously recycled to container 6. The flue gases in an amount of 2219 $Nm^3/h$ were cooled from a temperature of 200° C. in conduit 31 to 65° C. in conduit 33 during scrubbing. The heat removed from the flue gases caused 300 kg/h of water to be evaporated from the scrubbing slurry. Before the flue gases entered scrubber 32, they contained 27 kg/h HCl and no sulfur dioxide, and after scrubbing, the flue gases contained less than 30 $mg/Nm^3$ of HCl. The hydrochloric acid washed out of the flue gases was returned in conduit 10 to container 6 with the slurry to participate again in the process. A total of 115 $m^3/h$ of air were concurrently blown into precipitation stages 6 and 11 for the oxidation of the Fe(II)-ions and the air was distributed throughout the concurrently flowing slurry by the agitators in the containers. The sinter magnesia yield was 542 kg/h.

While the invention has been described in connection with a now preferred installation and has been illustrated by two working examples, those skilled in the art will understand that it is not limited to these preferred embodiments. For example, the illustrated raw material dissolving stages and the precipitating stages need not consist of three and two reaction vessels, respectively, but the number of vessels in each stage may be decreased or increased according to specific requirements. For instance, a single container may be used for each stage. In a batch operation, the raw material may first be dissolved and the impurities may then be precipitated from the resultant slurry in a single vessel.

Following the teaching of Austrian Pat. No. 357,138, it is possible to precipitate the calcium sulfate as well as the hydroxides from the concentrated slurry in stage 40. In this case, the output of container 5 is introduced directly into conduit 15 and containers 6 and 11, with their inlet and outlet conduits, including conduits 9 and 10 leading to and from flue gas scrubber 32, are placed in stage 40. All the precipitates are then removed together in this stage.

What we claim is:

1. A process of preparing sinter magnesia from magnesium oxide in a sintering kiln evolving flue gases including hydrochloric acid and sulfur dioxide during sintering, the magnesium oxide being prepared by the thermal decomposition of a magnesium chloride sol derived from a slurry of a magnesium-containing starting material dissolved in hydrochloric acid to form a magnesium chloride slurry and subsequent treatment of the slurry to precipitate and remove impurities therefrom, comprising the steps of washing said flue gases before removal thereof from the kiln to the atmosphere with a portion of the magnesium chloride slurry formed during the preparation of the magnesium oxide, and recycling the magnesium chloride slurry used for washing the flue gases to the slurry wherefrom the magnesium sol is derived.

2. The process of claim 1, wherein the subsequent treatment includes the step of adding sulfate ions to the slurry to precipitate and remove calcium impurities in the form of calcium sulfate.

3. The process of claim 1 or 2, wherein the magnesium chloride slurry for washing the flue gases contains $Fe(OH)_3$ suspended therein.

4. The process of claim 3, wherein the magnesium chloride slurry contains between 10 and 70 g/l of freshly precipitated $Fe(OH)_3$.

5. The process of claim 1 or 2, wherein the pH-value of the magnesium chloride slurry for washing the flue gases has been adjusted by the addition of a substance decreasing the acidity to a value promoting the precipitation of the impurities but the slurry still contains impurities.

6. The process of claim 5, wherein the impurities are precipitated from the slurry in a container, the slurry for washing the flue gases is taken from the container and recycled thereto.

7. The process of claim 1 or 2, wherein air is blown into the magnesium chloride slurry used for washing the flue gases.

8. The process of claim 1 or 2, further comprising the step of adjusting the pH-value of the magnesium chloride slurry used for washing the flue gases to 3.5 to 7.

* * * * *